March 4, 1958 R. NATONEK 2,825,335
BABY'S RATTLED RUBBER SOOTHER
Filed June 2, 1954
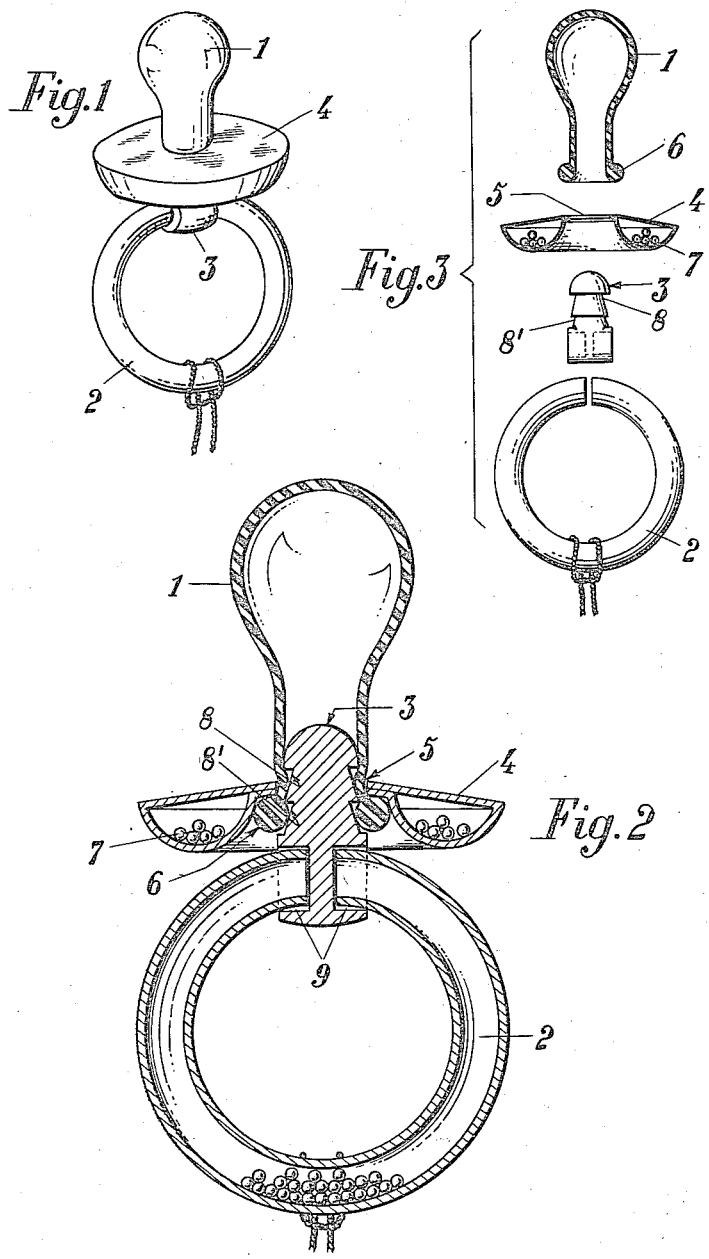
INVENTOR
RAOUL NATONEK
BY
ATTORNEYS

2,825,335

BABY'S RATTLED RUBBER SOOTHER

Raoul Natonek, Rome, Italy

Application June 2, 1954, Serial No. 434,006

Claims priority, application Italy June 10, 1953

4 Claims. (Cl. 128—360)

The present invention relates to a baby's rattled rubber soother.

The purpose of the present invention is that of joining the actual use of the rubber teat to that of a toy, due to insertion of small pellets or the like within the parts forming the soother, which pellets or the like when shaked and striking the inner walls, cause a sound to the baby's delight and amusement.

Said purpose is embodied by means of a teat made of rubber, plastic material or the like, connected to a ring or other teething member, by means of an assembling member, while a substantially flat, but hollow stop member limits the insertion both of the rubber teat and of the teething ring into the baby's mouth.

The sounding effect is attained, according to a preferred form of embodiment of this invention by inserting small balls or pellets within the recess of the stop member, which balls striking, when shaked, against the inner walls of said member, cause a sound; a greater sounding effect is obtained by rendering hollow also the teething ring and inserting therein the small balls. It is also possible to embody the hollow parts with a transparent material and to insert variously colored small balls in said parts, so that also a visual effect is added to the sounding effect.

The assembling or connecting member between the teething ring and the rubber teat may have different shapes in order to ensure the fixing thereon of the teething ring as well as of the rubber teat and of the stop member. Said assembling means can be formed by frusto-cones defined by means of indentations, arranged in series in order to prevent the rubber teat from being removed; the aforesaid assembling means can also be simply a cylindrical member, anyhow it is provided at its outer end with two opposite recesses or with a hole therethrough for mounting thereupon the teething ring.

One preferred form of embodiment of this invention is shown in the attached drawing wherein:

Fig. 1 shows a perspective view of the rubber teat according to this invention;

Fig. 2 shows, in enlarged scale, a cross-section of the teat;

Fig. 3 shows an exploded view of the teat.

With reference to the drawings, a teat 1, embodied according to the known processes, made of rubber, plastic material or the like, is fixed to a teething ring 2 by means of an assembling member 3. Mounted on said assembling member 3, whereon in turn is mounted the rubber teat, is a stop member 4 the purpose whereof is that of limiting the insertion in the baby's mouth of the rubber teat as well as of the teething ring, said parts being opposite in respect to said stop member which has an area greater than the common open mouth of a baby.

The stop member 4 has a substantially toroidal shape. The central hole 5 of said member serves for inserting said stop member 4 on the assembling member 3, when on said assembling means the rubber teat 1 has already been inserted. Therefore the stop member 4 serves also for fixing the rubber teat 1 on the assembling member 3 by pressing thereon the rubber teat in co-operation with the shoulder 6 limiting the lower portion of the rubber teat. The member 4, made of rigid plastic material, is internally hollow and in its recess are introduced, when manufactured, a plurality of pellets or small balls 7 which, when the soother is shaked cause a rattle.

In order to render easier the mounting of the assembly, the member 4 may consist of two annular parts which can be snap-closed and one whereof is provided, at its central zone with a cylindrical flange fitting in a hole provided in the other part, so as to offer a greater surface for tightening the rubber teat 1.

The assembling member 3 has a substantially cylindrical shape. In the embodiment shown in Fig. 2, circular indentations 8, 8' create on the cylinder a series of frusto-cones arranged one above the other. The indentations have the purpose, when is exerted thereon the pressure due to the insertion of the ring 4, of preventing the rubber teat 1 from being removed from the member 3; the lowest indentation 8' serves for the insertion thereabout of the bead of the rubber teat 1 for furtherly fixing, as aforesaid, the rubber teat on the member 3.

The teething ring 2 is fixed on the assembling member 3. This latter is provided at its outer end with two opposite blind holes 9 wherein are inserted two ends of the split ring 2; the resilience of said ring allows said ends to be temporarily spaced apart for their insertion into the holes 9 of the member 3.

As aforesaid, the ring 2 can also be hollow and inside said ring can be arranged other pellets. In turn, all of the hollow parts of the soother can be made of transparent material, so as to allow the pellets, which are eventually made in different colors, to be seen.

It is to be noted that the wording "teething ring" must not be understood in its limitative meaning, as said member can have also different shapes without issuing from the scope of the present invention.

I claim:

1. A baby's soother comprising a rubber nipple, a split ring teething member, a stop member, at least one of said members being hollow, pellets in the hollow member, and an assembling member substantially cylindrical in shape and having a plurality of circular indentations defining a plurality of frusto-cones over which said nipple is drawn, and said stop member fitted over said nipple pressing said nipple into one of said indentations, the outer end of said assembling member having two diametrically opposite blind holes receiving the ends of said split ring teething member.

2. A baby's soother according to claim 1, characterised in that said stop member has a substantially toroidal shape and a size greater than the baby's open mouth.

3. A baby's soother according to claim 2, characterised in that said stop member is hollow and pellets or the like are provided inside it.

4. A baby's soother according to claim 3, characterised in that said stop member is formed by two annular parts which can be snap closed, one of which is provided at its central zone with a cylindrical flange fitting in a hole provided in the other part.

References Cited in the file of this patent

UNITED STATES PATENTS

| 954,066 | Ware | Apr. 5, 1910 |
| 2,532,116 | Monaco | Nov. 28, 1950 |

FOREIGN PATENTS

| 7,964 | Great Britain | Mar. 27, 1897 |
| 246,218 | Germany | Apr. 26, 1912 |
| 818,830 | Germany | Oct. 29, 1951 |